United States Patent
Adaniya et al.

(10) Patent No.: US 7,541,711 B2
(45) Date of Patent: Jun. 2, 2009

(54) ELECTRIC MOTOR, STATOR OF ELECTRIC MOTOR, AND MANUFACTURING METHOD FOR THE STATOR

(75) Inventors: Taku Adaniya, Kariya (JP); Minoru Mera, Kariya (JP); Hideo Nakai, Nisshin (JP); Kenji Hiramoto, Aichi-ken (JP)

(73) Assignee: Kabushiki Kaisha Toyota Jidoshokki, Kariya-shi (JP)

( * ) Notice: Subject to any disclaimer, the term of this patent is extended or adjusted under 35 U.S.C. 154(b) by 0 days.

(21) Appl. No.: 11/807,886

(22) Filed: May 29, 2007

(65) Prior Publication Data
US 2007/0290567 A1    Dec. 20, 2007

(30) Foreign Application Priority Data
May 30, 2006   (JP)   ............................. 2006-150413

(51) Int. Cl.
*H02K 1/18* (2006.01)
*H02K 1/14* (2006.01)
*H02K 1/16* (2006.01)

(52) U.S. Cl. .................. 310/218; 310/217; 310/259

(58) Field of Classification Search ................. 310/217, 310/218, 259; *H02K 1/20, 15/02, 1/12, 1/14, H02K 1/18, 1/02*
See application file for complete search history.

(56) References Cited

U.S. PATENT DOCUMENTS

| | | | | |
|---|---|---|---|---|
| 2,308,028 A | * | 1/1943 | Rose et al. | .................. 310/218 |
| 3,159,762 A | * | 12/1964 | Haifley et al. | ................ 310/217 |
| 4,241,274 A | * | 12/1980 | Brammerlo | ................. 310/259 |
| 5,918,360 A | | 7/1999 | Forbes et al. | |
| 6,472,780 B2 | | 10/2002 | Kikuchi et al. | |
| 7,211,918 B2 | * | 5/2007 | Migita et al. | ................. 310/215 |
| 2003/0168926 A1 | | 9/2003 | Zepp et al. | |
| 2004/0212267 A1 | * | 10/2004 | Jack et al. | .............. 310/156.56 |
| 2005/0242670 A1 | | 11/2005 | Lee | |

FOREIGN PATENT DOCUMENTS

| | | |
|---|---|---|
| DE | 875 227 | 4/1953 |
| DE | 102 59 521 A1 | 6/2004 |

(Continued)

OTHER PUBLICATIONS

English machine translation of JP 05219667.*

(Continued)

*Primary Examiner*—Quyen P Leung
*Assistant Examiner*—John K Kim
(74) *Attorney, Agent, or Firm*—Locke Lord Bissell & Liddell LLP

(57) ABSTRACT

A stator of an electric motor includes teeth, coils each wound about one of the teeth, and a yoke. Each tooth includes a tooth main body and a tooth reinforcing portion, which is integrally molded with at least a part of the surface of the tooth main body. The tooth main portions are formed a powder magnetic core material. The tooth reinforcing portions have a higher mechanical strength than that of the tooth main bodies. The yoke has fitting openings each receiving one of the teeth. Each tooth is fitted to the corresponding fitting opening in such a manner that the tooth reinforcing portion contacts a wall surface that defines the fitting opening.

4 Claims, 15 Drawing Sheets

FOREIGN PATENT DOCUMENTS

| | | | |
|---|---|---|---|
| JP | 05083901 A | * | 4/1993 |
| JP | 05219667 A | * | 8/1993 |
| JP | 06113491 A | * | 4/1994 |
| JP | 10-225038 | | 8/1998 |
| JP | 11-275781 | | 10/1999 |
| JP | 2000-184634 | | 6/2000 |
| JP | 2002-165410 | | 6/2002 |
| JP | 2003-199319 | | 7/2003 |
| JP | 2004-197157 | | 7/2004 |
| JP | 2004-289899 | | 10/2004 |
| JP | 2007135328 A | * | 5/2007 |
| JP | 2007259581 A | * | 10/2007 |

OTHER PUBLICATIONS

English machine translation of JP 06113491.*

JP 05219667_EN.pdf : Sato et al (JP 05219667, English translation.*

JP 2007135328_EN.pdf : Sato et al (JP 2007-135328, English translation.*

European Search Report dated Sep. 14, 2007 issued by European Patent Office for application No. 07108841.3-2207.

* cited by examiner

ELECTRIC MOTOR, STATOR OF ELECTRIC MOTOR, AND MANUFACTURING METHOD FOR THE STATOR

BACKGROUND OF THE INVENTION

The present invention relates to an electric motor, a stator of the electric motor, and a manufacturing method for the stator. More specifically, the present invention relates to an electric motor having a structure in which teeth made of a powder magnetic core material are fitted to a yoke, a stator of such an electric motor, and a manufacturing method for the stator.

FIG. 1 is a top plan view illustrating a prior art electric motor 10. The electric motor 10 has a stator 11 and a rotor 18. The stator 11 includes a plurality of teeth 12, a yoke 14, and a plurality of coils 16. The teeth 12 and the yoke 14 are molded separately. The stator 11 is formed in the following manner. First, the coils 16 are wound about the teeth 12, and then, an end 12b of each tooth 12 is fitted in a fitting groove formed in the yoke 14.

The teeth 12 are parts of the stator 11 that function as field poles. Typically, the teeth 12 are formed of steel. However, since the specific resistance of steel is $10^{-6}$ Ωm or less, the eddy-current loss of the teeth 12 is relatively great. Japanese Laid-Open Patent Publication Nos. 10-225038, 2004-289899, 2003-199319, 2002-165410, 2000-184634, and 11-275781 each disclose a tooth 12 shown in FIG. 2, which is formed by laminating copper plates 12a. Since the specific resistance of the tooth 12 along a direction of lamination of the steel plates 12a is greater than that of a tooth formed by a single steel member, the eddy-current loss is reduced.

Materials for forming the tooth 12 include powder magnetic core material. The powder magnetic core material refers to a material formed by mixing powder of metal magnetic material such as iron with resin. The tooth 12 is formed by pressure molding a powder magnetic core material. The specific resistance of the tooth 12, which is formed of a powder magnetic core material, is $10^{-4}$ Ωm or more. Thus, the eddy-current loss of the tooth 12 is reduced.

Referring to FIG. 3, Japanese Laid-Open Patent Publication No. 2004-197157 discloses a tooth 12 formed of a powder magnetic core material. The tooth 12 of FIG. 3 does not have a laminated structure, but is molded as an integral body. The tooth 12 of FIG. 3 is therefore advantageous in reducing the number of components.

Typically, the yoke 14 is formed of steel. Specifically, the yoke 14 is formed by laminating steel plates. Alternatively, the yoke 14 may be formed of a powder magnetic core material to reduce the eddy-current loss.

A tooth 12 made of a powder magnetic core material is easily damaged when fitted to the yoke 14.

When the tooth 12 made of a powder magnetic core material is fitted to the yoke 14 made of laminated steel plates, a part in the end 12b of the tooth 12 that contacts a wall surface defining the groove of the yoke 14 is likely to be damaged. Also, when the tooth 12 is fitted to the yoke 14, the end 12b of the tooth 12 is likely to be broken.

In the case where the tooth 12 and the yoke 14 are both made of a powder magnetic core material, fitting the tooth 12 to the yoke 14 is likely to damage not only the tooth 12, but also the wall surface defining the groove.

SUMMARY OF THE INVENTION

Accordingly, it is an objective of the present invention to suppress damages of teeth made of a powder magnetic core material and a yoke when fitting the teeth to the yoke.

To achieve the foregoing objective, and in accordance with a first aspect of the present invention, a stator of an electric motor is provided. The stator of an electric motor includes teeth, coils each being wound about one of the teeth, and a yoke having fitting openings each receiving one of the teeth. Each tooth has a tooth main body formed of a powder magnetic core material and a tooth reinforcing portion. The tooth reinforcing portion is molded integrally with at least a part of a surface of the tooth main body, and has a higher mechanical strength than that of the tooth main body. Each tooth is fitted to the corresponding fitting opening in such a manner that the tooth reinforcing portion contacts a wall surface that defines the fitting opening.

In accordance with a second aspect of the present invention, an electric motor is provided. The electric motor includes a stator and a rotor. The stator includes teeth, coils each being wound about one of the teeth, and a disc-shaped yoke having fitting holes each receiving one of the teeth. Each tooth has a tooth main body and a tooth reinforcing portion. The tooth main body is formed of a powder magnetic core material. The tooth reinforcing portion is integrally molded with at least a part of a surface of the tooth main body, and has a higher mechanical strength than that of the tooth main body. Each fitting hole extends through the yoke from a front surface to a back surface. Each tooth is fitted to the corresponding fitting hole in such a manner that the tooth reinforcing portion contacts a wall surface that defines the fitting hole. The rotor has a disc-shaped rotor main body and a shaft. The rotor main body is coaxially arranged with the yoke, and the shaft is coaxially arranged with the rotor main body. The rotor main body is displaced in an axial direction from the teeth.

In accordance with a third aspect of the present invention, a manufacturing method for a stator of an electric motor is provided. The stator has a plurality of teeth each having a tooth main body formed of a powder magnetic core material. The method includes: molding a tooth reinforcing portion integrally with at least a part of a surface of each tooth main body, the tooth reinforcing portion having a higher mechanical strength than that of the tooth main body; forming a yoke having a fitting openings each receiving one of the teeth; winding a coil about each of the teeth; and fitting the teeth to the fitting openings in such a manner that each tooth reinforcing portion contacts a wall surface defining the corresponding fitting opening.

DESCRIPTION OF THE PREFERRED EMBODIMENTS

One embodiment of the present invention will now be described with reference to FIGS. 4 to 17.

Figure 1:
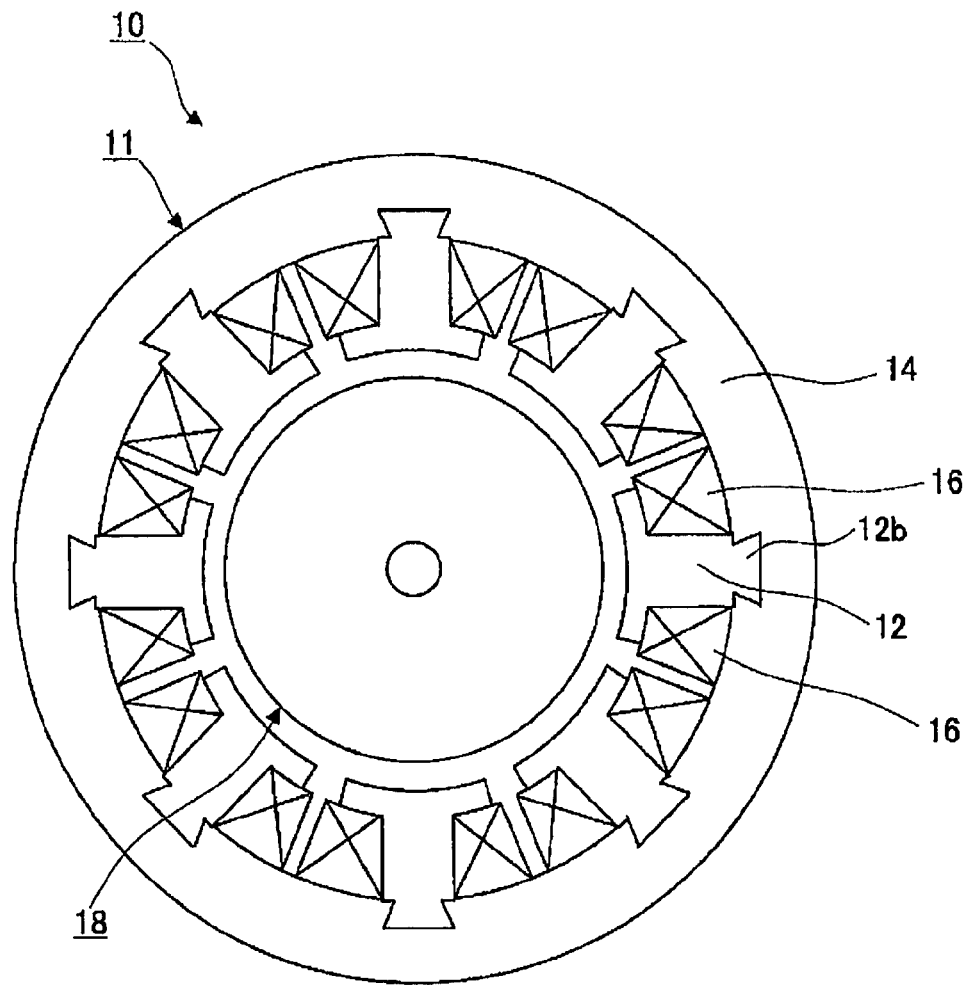
FIG. 1 is a top plan view illustrating a prior art electric motor.
Figure 2:
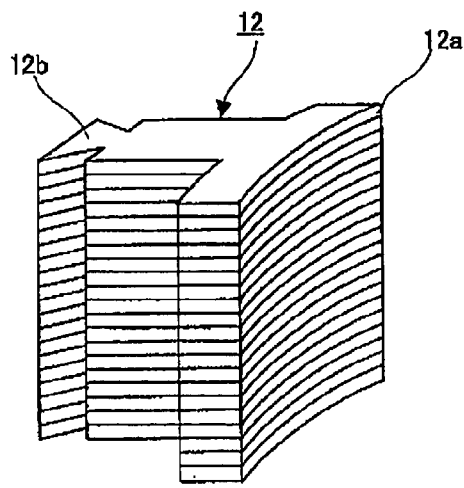
FIG. 2 is a perspective view illustrating a tooth of the electric motor shown in FIG. 1, the tooth being formed of laminated steel plates.
Figure 3:
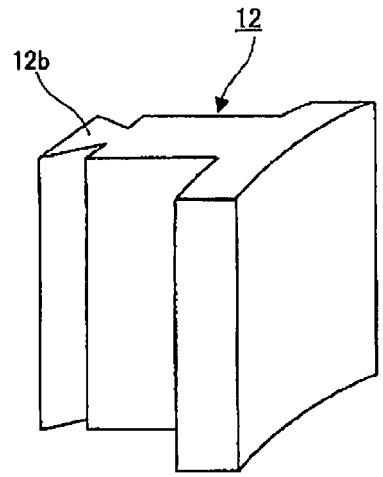
FIG. 3 is a perspective view illustrating a tooth of the electric motor shown in FIG. 1, the tooth being formed of a powder magnetic core material.
Figure 4:
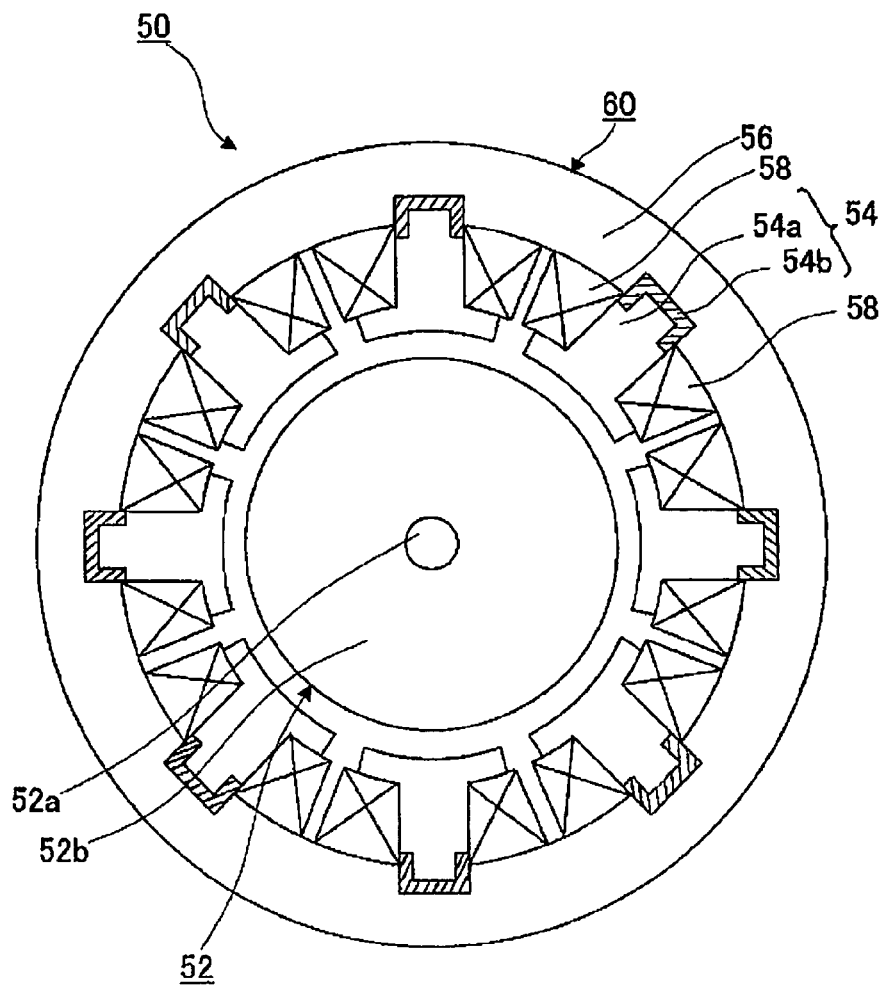
FIG. 4 is a top plan view illustrating an electric motor according to the present invention.

As shown in FIG. 4, an electric motor 50 includes a rotor 52 and a stator 60. The rotor 52 includes a shaft 52a, and a cylindrical rotor main body 52b attached to the shaft 52a. The stator 60 includes a plurality of teeth 54, a yoke 56, and a plurality of coils 58.

Each tooth 54 is substantially T-shaped as viewed in the axial direction of the stator 60. In the tooth 54, a portion that extends in the radial direction of the stator 60 is referred to as a proximal portion, and a portion that extends from both sides in the circumferential direction of the stator 60 is referred to as a head. The head of the tooth 54 faces the rotor 52. The head of the tooth 54 is formed relatively wide so that sufficient magnetic lines of force passing through the tooth 54 reach the rotor 52.

Figure 5:
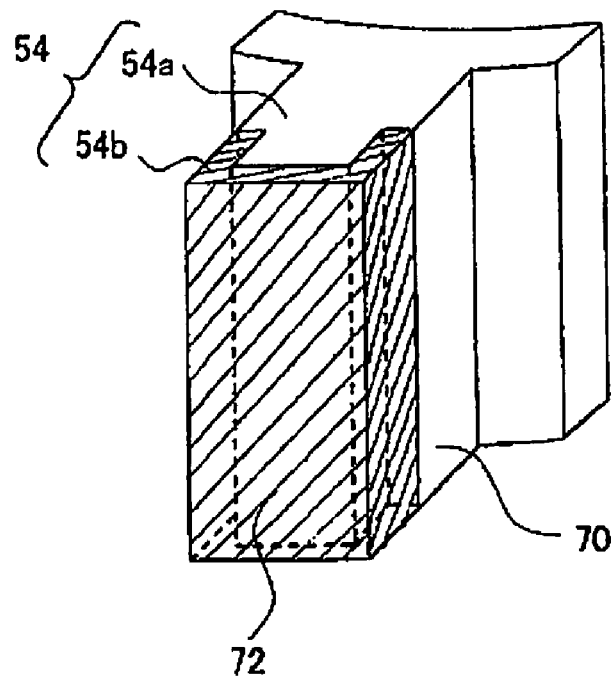
FIG. 5 is a perspective view illustrating a tooth of the electric motor shown in FIG. 4.

As shown in FIG. 5, the tooth 54 includes a tooth main body 54a and a tooth reinforcing portion 54b. In the tooth main body 54a, a portion that extends in the radial direction of the stator 60 is referred to as a proximal portion, and a portion that extends from both sides in the circumferential direction of the stator 60 is referred to as a head.

The tooth main body 54a is formed of a material obtained by mixing magnetic material powder and resin. The magnetic material may be, for example, a metal such as iron, aluminum, and titanium, or an alloy containing such metal. The resin contained in the powder magnetic core material is an electrical insulating resin. The tooth main body 54a is formed by pressure molding the powder magnetic core material.

The specific resistance of the tooth main body 54a is equal to or more than one hundred times that of steel. For example, the specific resistance of the tooth main body 54a is $10^{-4}$ Ωm or more.

The tooth reinforcing portion 54b is provided at an end of the proximal portion of the tooth main body 54a. Specifically, the tooth reinforcing portion 54b is shaped like a channel and covers part of side surfaces 70 of the proximal portion of the tooth main body 54a, which are parallel to the axis of the stator 60, and the end face of the proximal portion of the tooth main body 54a. The tooth reinforcing portion 54b forms parts of the side surfaces 70 of the proximal portion of the tooth 54, and an end face 72 of the tooth 54. The tooth reinforcing portion 54b is molded integrally with the tooth main body 54a.

The tooth reinforcing portion 54b is made of a magnetic material having a mechanical strength higher than that of the tooth main body 54a. The tooth reinforcing portion 54b is, for example, formed of steel, stainless steel, soft magnetic stainless steel, or aluminum.

Figure 6:
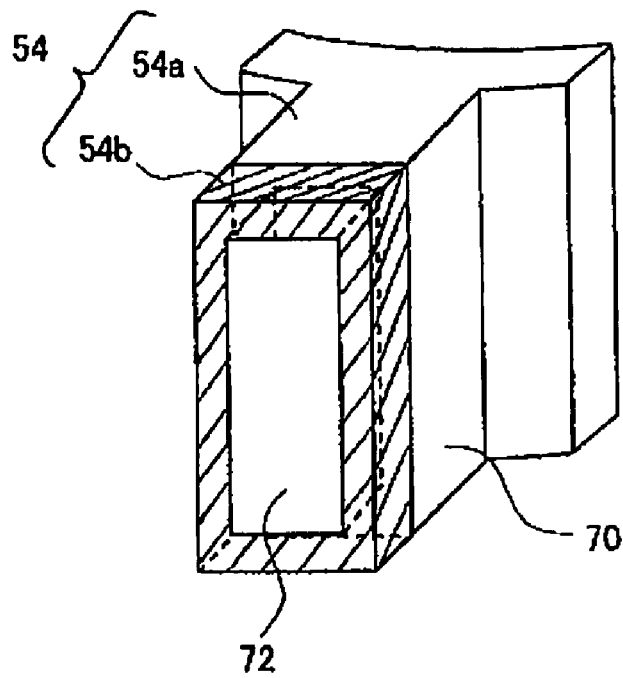
FIG. 6 is a perspective view illustrating a tooth according to another embodiment.

As shown in FIG. 6, the tooth reinforcing portion 54b may have a shape to surround the four sides of the end of the proximal portion of the tooth main body 54a. That is, the tooth reinforcing portion 54b surrounds both sides, and upper and lower end of the proximal portion of the tooth main body 54a, and expose the end face of the proximal portion of the tooth main body 54a. In this case, the end face of the proximal portion of the tooth main body 54a corresponds to the end face 72 of the proximal portion of the tooth 54.

The tooth reinforcing portion 54b having such a structure has a volume ratio of the tooth reinforcing portion 54b in the tooth 54 less than that of the tooth 54 shown in FIG. 5. This prevents the specific resistance of the tooth 54 from being reduced by the tooth reinforcing portion 54b. As a result, the occurrence of eddy-current loss in the tooth 54 is suppressed.

Figure 7:
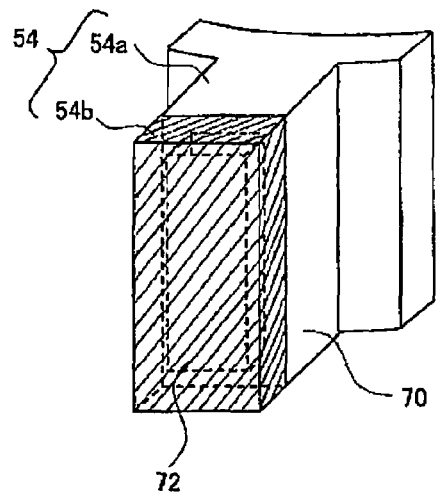
FIG. 7 is a perspective view illustrating a tooth according to another embodiment.

The tooth reinforcing portion 54b shown in FIG. 6 may be modified as shown in FIG. 7. The tooth reinforcing portion 54b of FIG. 7 has a portion that covers the end face of the proximal portion of the tooth main body 54a. In this case, the end face of the tooth reinforcing portion 54b corresponds to the end face 72 of the proximal portion of the tooth 54.

The coil 58 is wound about the tooth 54. For example, enameled copper wires are used as the coils 58.

Figure 8:
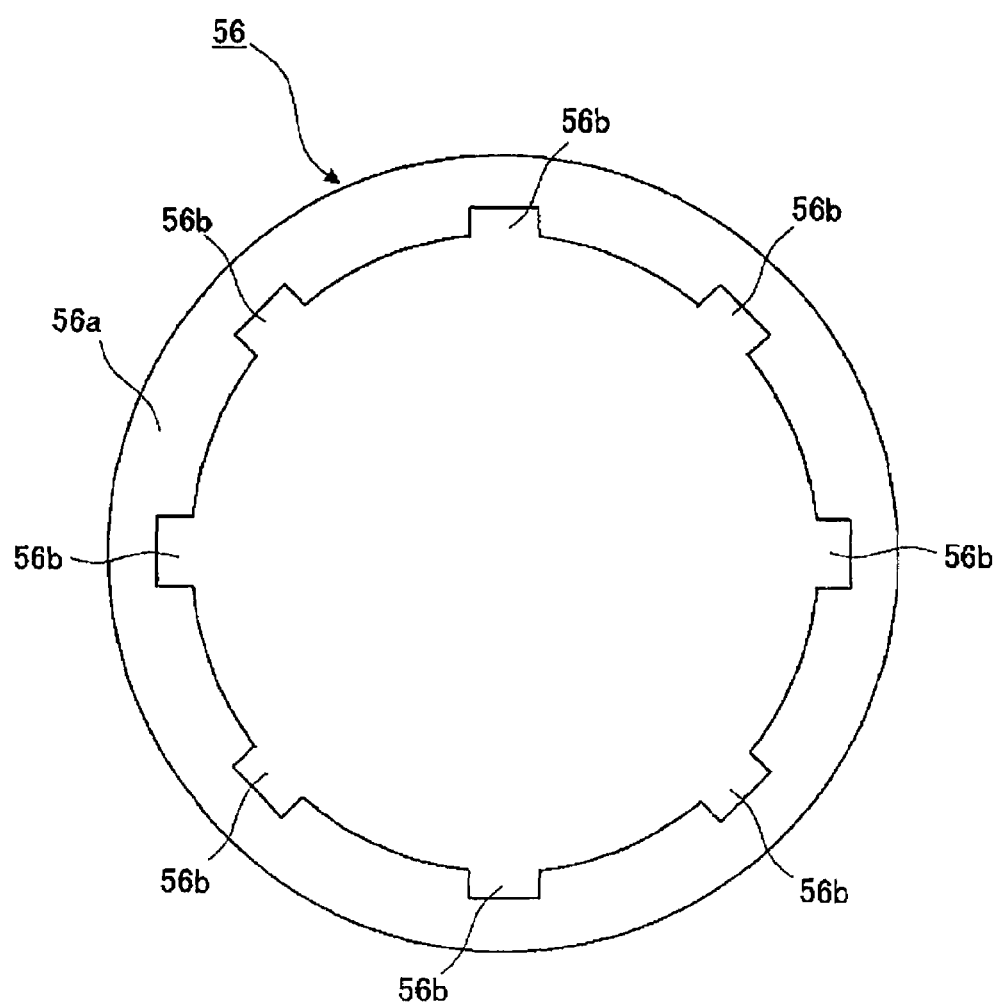
FIG. 8 is a top plan view illustrating the yoke of the electric motor shown in FIG. 4.
Figure 9:
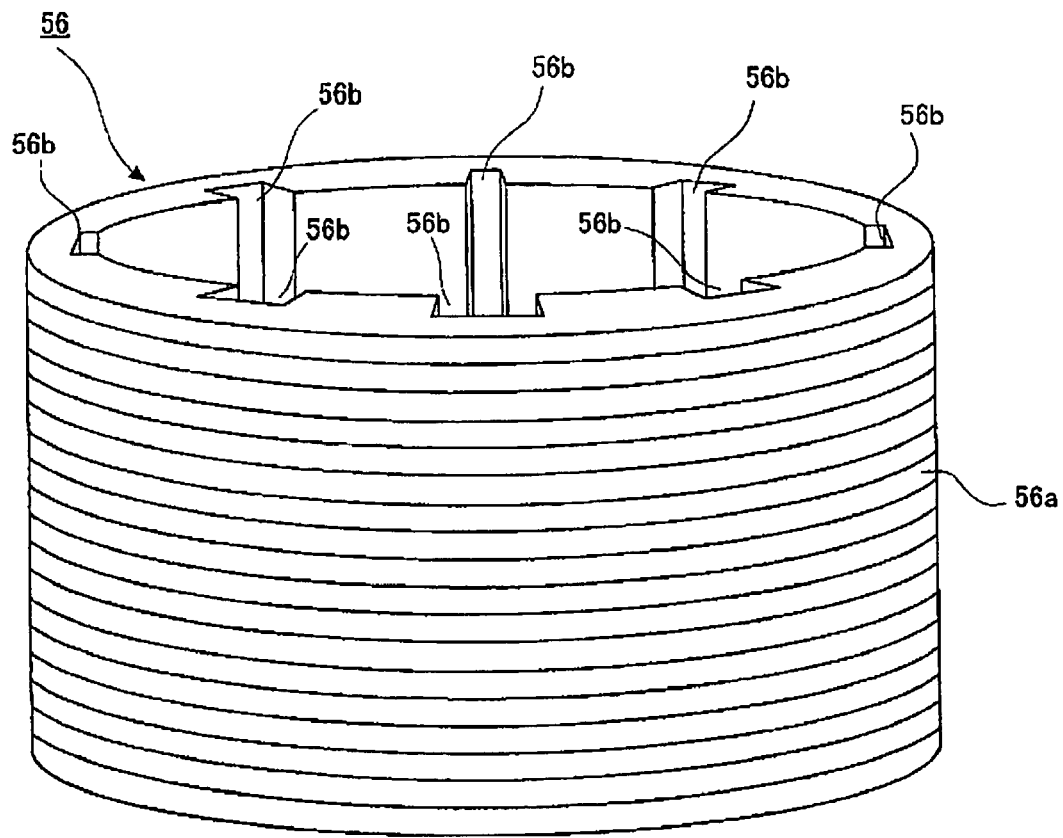
FIG. 9 is a perspective view formed of laminated steel plates.

FIG. 8 shows a top plan view of the yoke 56. FIG. 9 is a perspective view of the yoke 56.

The yoke 56 is formed to have a cylindrical shape by laminating annular steel plates. Notches the number of which is the same as the number of the teeth 54 are formed on the inner circumferential portion. The notches are arranged in each steel plates at equal angular intervals. As shown in FIG. 9, the steel plates are laminated such that the notches of each steel plate are aligned with the notches of adjacent steel plates. Accordingly, fitting grooves 56b, which serve as fitting openings, are formed in the yoke 56.

The distal ends of the proximal portions of the teeth 54 are engaged with the fitting grooves 56b. The shape and size of a portion of the tooth 54 that is engaged with the fitting groove 56b, that is, the shape and size of the tooth reinforcing portion 54b, agree with those of a wall surface defining the fitting groove 56b. According to this configuration, the tooth reinforcing portion 54b protects a part of the proximal portion of the tooth 54 that contacts a wall surface of the yoke 56 that defines the fitting groove 56b.

Figure 10:
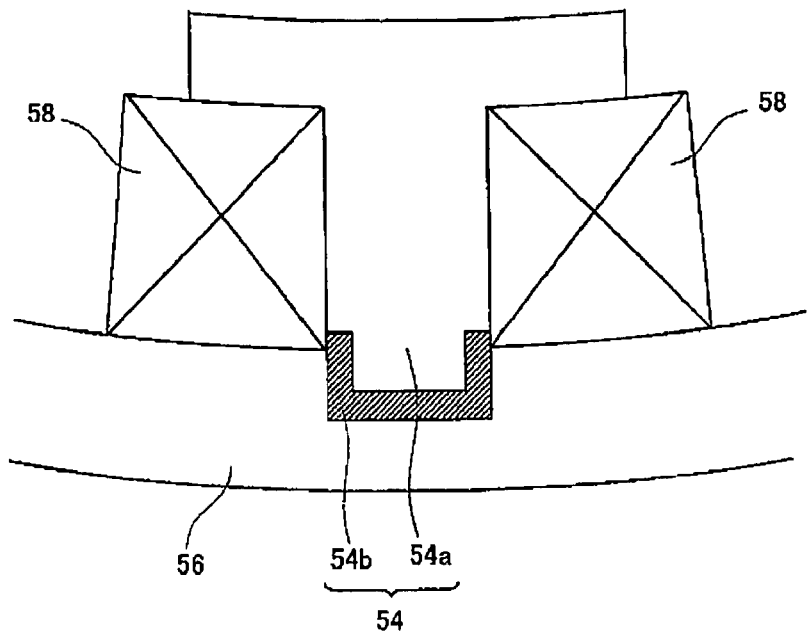
FIG. 10 is a partially top plan view illustrating the stator shown in FIG. 4.

FIG. 10 shows a state in which the tooth 54 is engaged with the fitting groove 56b. The tooth 54, about which the coil 58 is wound, is engaged with the yoke 56. More specifically, the tooth reinforcing portion 54b provided at the proximal portion of the tooth 54 is engaged to closely contact the wall surface of the fitting groove 56b formed in the yoke 56. The surface of the tooth main body 54a made of a powder magnetic core material is protected by the tooth reinforcing portion 54b. As a result, the surface of the tooth 54 is prevented from being damaged when the tooth 54 is engaged with the fitting groove 56b.

After all the teeth 54 are engaged with the yoke 56, the tooth reinforcing portions 54b may be welded to the steel plates forming the yoke 56 on the surface of the yoke 56. In this case, the teeth 54 are firmly fixed to the yoke 56.

A shaft 52a of the rotor 52 is formed of steel. The rotor main body 52b is made of a permanent magnet or an electromagnet. The material of the rotor main body 52b is, for example, steel or a powder magnetic core material.

The rotor 52 is arranged coaxially with the yoke 56, and is rotatable relative to the stator 60 about the center axis of the yoke 56.

Figure 11:
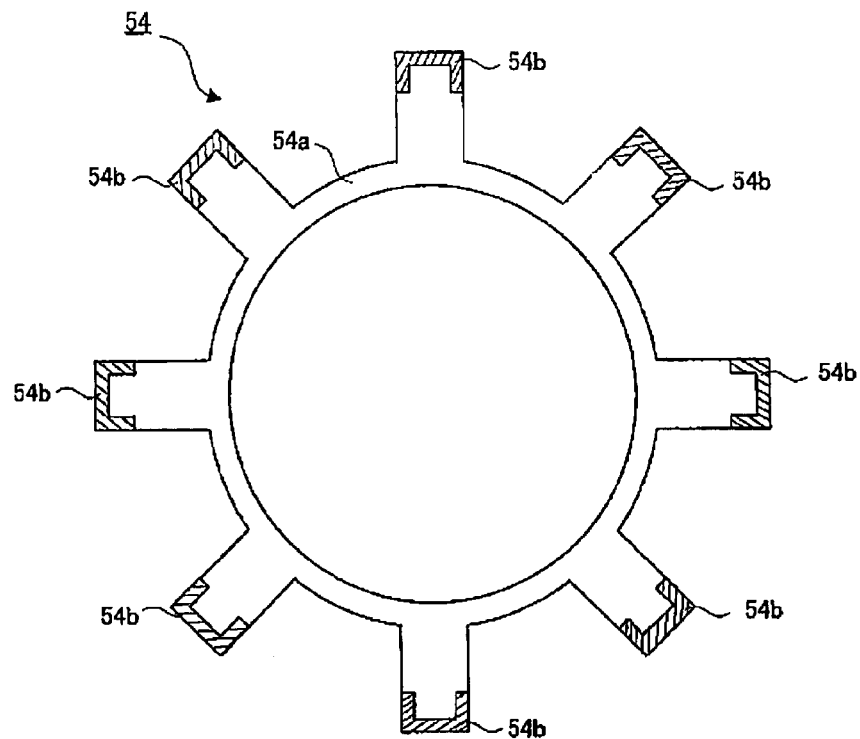
FIG. 11 is a top plan view illustrating teeth integrally molded by coupling members made of a powder magnetic core material.

As shown in FIG. 11, a plurality of teeth 54 may be molded integrally. That is, a plurality of teeth 54 may be formed to be a single component. The head of each the tooth 54 is coupled to the heads of the adjacent teeth 54 by means of coupling members made of a powder magnetic core material. Alternatively, at least two of the teeth 54 may be molded integrally by coupling the heads by means of a coupling member. In this case, the number of components forming the stator 60 is reduced.

Figure 12:
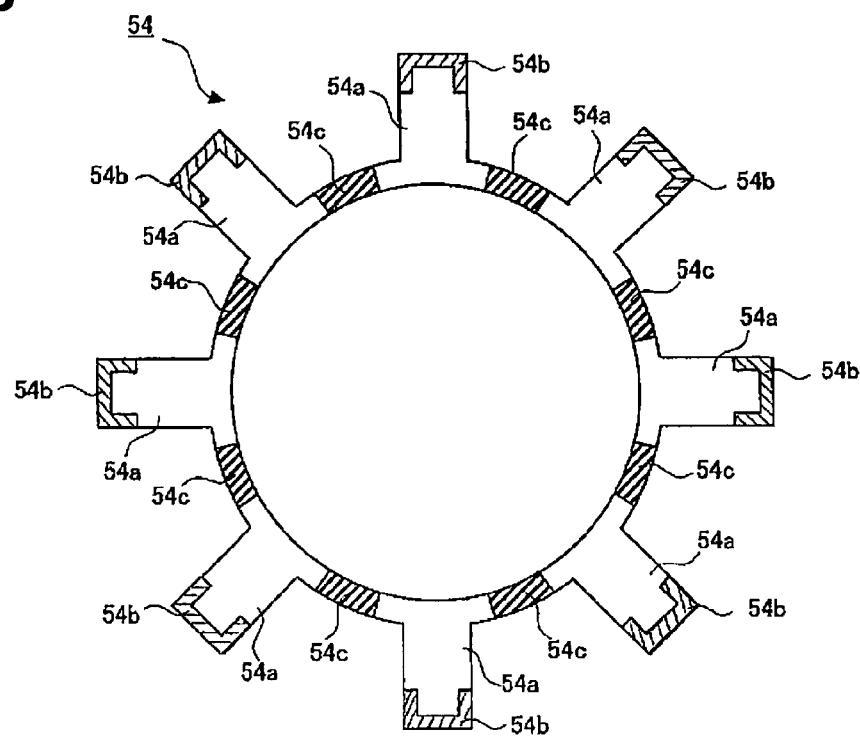
FIG. 12 is a top plan view illustrating teeth integrally molded by coupling members made of a resin.

As shown in FIG. 12, the heads of the tooth 54 may be molded integrally by means of resin coupling members 54c. In this case, since resin is electrically insulating, the eddy-current loss in the integrally molded teeth 54 is reduced.

In the case where any of the teeth 54 shown in FIGS. 5 to 7 is employed, the stator 60 is formed by moving the teeth 54 along the radial direction of the yoke 56 from the center axis of the yoke 56 toward the fitting grooves 56b, or by moving the teeth 54 along the axis of the yoke 56 toward the fitting grooves 56b, which open upward in the yoke 56 thereby inserting the teeth 54 into the fitting grooves 56b. When the teeth 54 shown in FIGS. 11 and 12 are employed, the stator 60 is formed by moving the teeth 54 in an axial direction toward the fitting grooves 56b open upward of the yoke 56, and then inserting the teeth 54 into the fitting grooves 56b.

A procedure for manufacturing the stator 60 according to the present invention will be described with reference to FIG. 13.

At step S10, the teeth 54 are formed.

Figure 14:
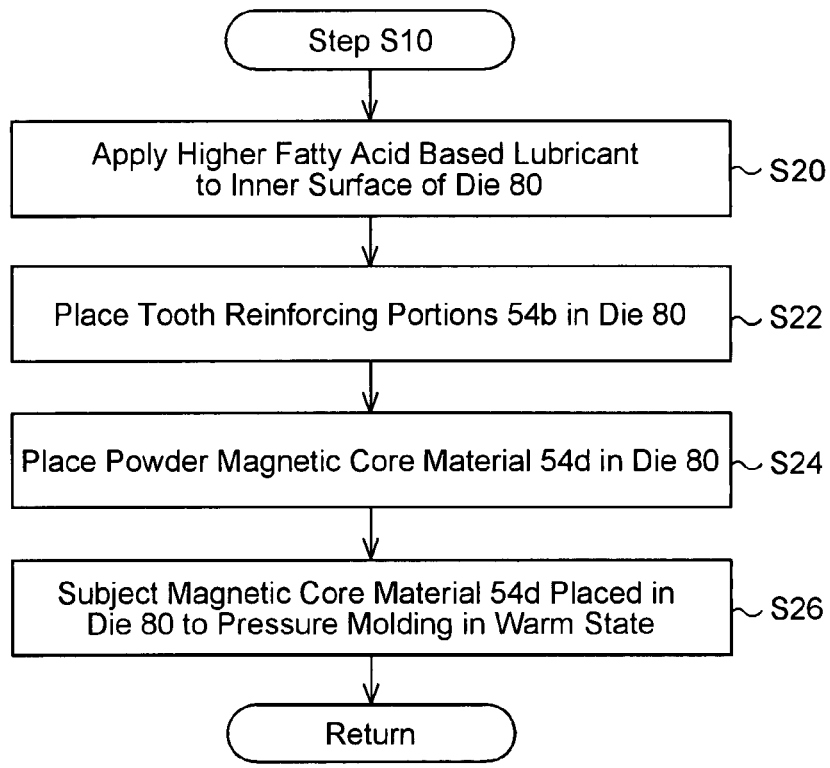
FIG. 14 is a detailed diagram showing a step in the manufacturing process for the tooth of the electric motor shown in FIG. 4.

FIG. 14 is a detailed diagram showing a manufacturing process for manufacturing the tooth 54 in step S10. First, in step S20, a higher fatty acid based lubricant is applied to an inner surface of a die 80 (see FIG. 15) for molding the tooth 54. The lubricant includes a lubricant made of a higher fatty acid and a lubricant made of a metal salt of a higher fatty acid. For example, the higher fatty acid may be stearic acid, palmitic acid, or oleic acid. The metal salt of higher fatty acid may be lithium salt, calcium salt, or zinc salt. The higher fatty acid based lubricant is preferably solid in a temperature range from a room temperature to a temperature for warm working.

Figure 15:
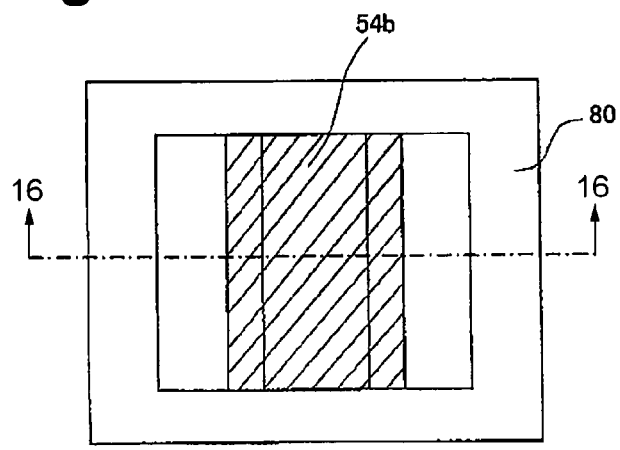
FIG. 15 is a top plan view illustrating a die in which a tooth reinforcing portion is placed.
Figure 16:
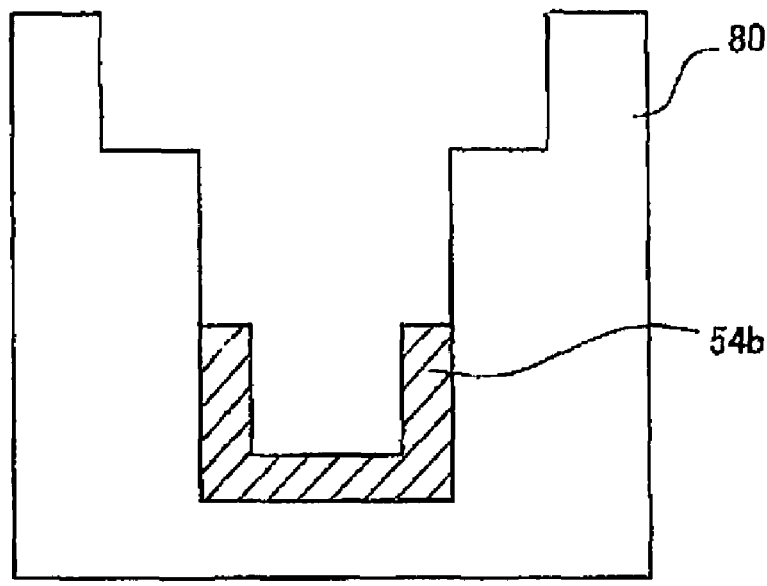
FIG. 16 is a cross-sectional view taken along line 16-16 of FIG. 15.

When step S20 is completed, the process proceeds to step S22. In step S22, the tooth reinforcing portion 54b is placed in the die 80. FIG. 15 is a top plan view of the die 80 in which the tooth reinforcing portion 54b is placed. FIG. 16 is a cross-sectional side view illustrating the die 80. As shown in FIG. 16, the tooth reinforcing portion 54b, which has been machined in advance to contact the bottom and side wall surfaces of the interior of the die 80, is placed in the die 80. Alternatively, a number of small pieces for forming the tooth reinforcing portion 54b may be placed in the die 80, so that the tooth reinforcing portion 54b is placed in the die 80.

Figure 17:
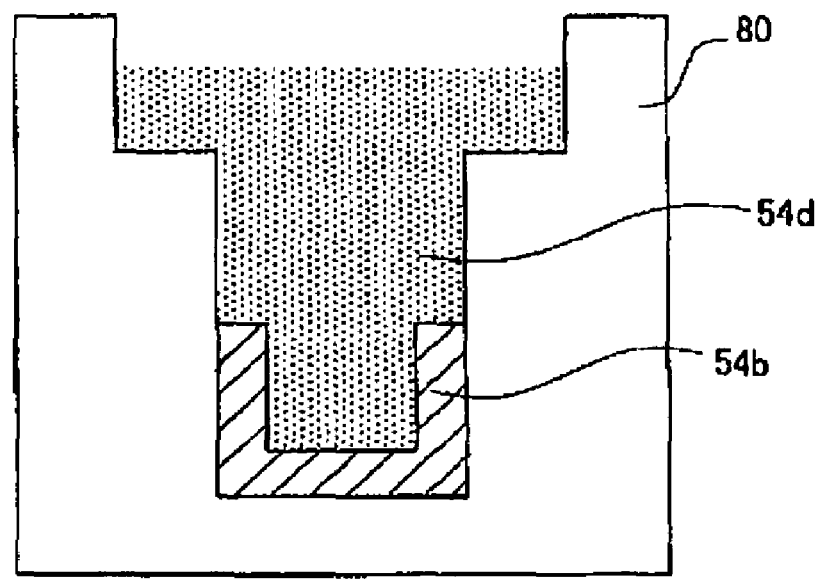
FIG. 17 is a cross-sectional side view showing a state of the die shown in FIG. 15, in which a powder magnetic core material fills the die.

When step S22 is completed, the process proceeds to step S24. In step S24, as shown in FIG. 17, a powder magnetic core material 54d fills the die 80, in which the tooth reinforcing portion 54b is placed.

When filling the die 80 with the powder magnetic core material 54d, the powder magnetic core material 54d and the die 80 are preferably warmed in advance. If these components are warmed, the powder magnetic core material 54d and the higher fatty acid based lubricant on the inner surface of the die 80 react to each other in a stable manner in the steps after the filling. Thus, a uniform lubricant film is easily formed between the powder magnetic core material 54d and the inner surface of the die 80. For example, the powder magnetic core material 54d and the die 80 are heated to a temperature equal to or more than 100° C.

When step S24 is completed, the process proceeds to step S26. In step S26, the magnetic core material 54d placed in the die 80 is subjected to the pressure molding in a warm state. In this embodiment, the temperature of a portion in which the die 80 contacts the magnetic core material 54d is preferably in a warm state between 100° C. and 225° C., and more preferably in a warm state between 100° C. and 180° C. With the die 80 being warmed to be in such a warm state, pressure is applied to the magnetic core material 54d through an opening of the die 80. For example, if iron powder is contained in the magnetic core material 54d, a pressure the lower limit of which is 700 MPa is applied to the magnetic core material 54d to ensure a sufficient biding strength between the tooth main body 54a and the tooth reinforcing portion 54b. In this case, no upper limit of the applied pressure is set. Through the execution of step S24, the tooth 54, which is formed by integrally molding the tooth main body 54a and the tooth reinforcing portion 54b, is formed in the die 80. Next, a predetermined force is applied to the die 80 to remove the tooth 54 from the die 80. Step S26 is thus competed, and step S10 is completed.

Figure 13:
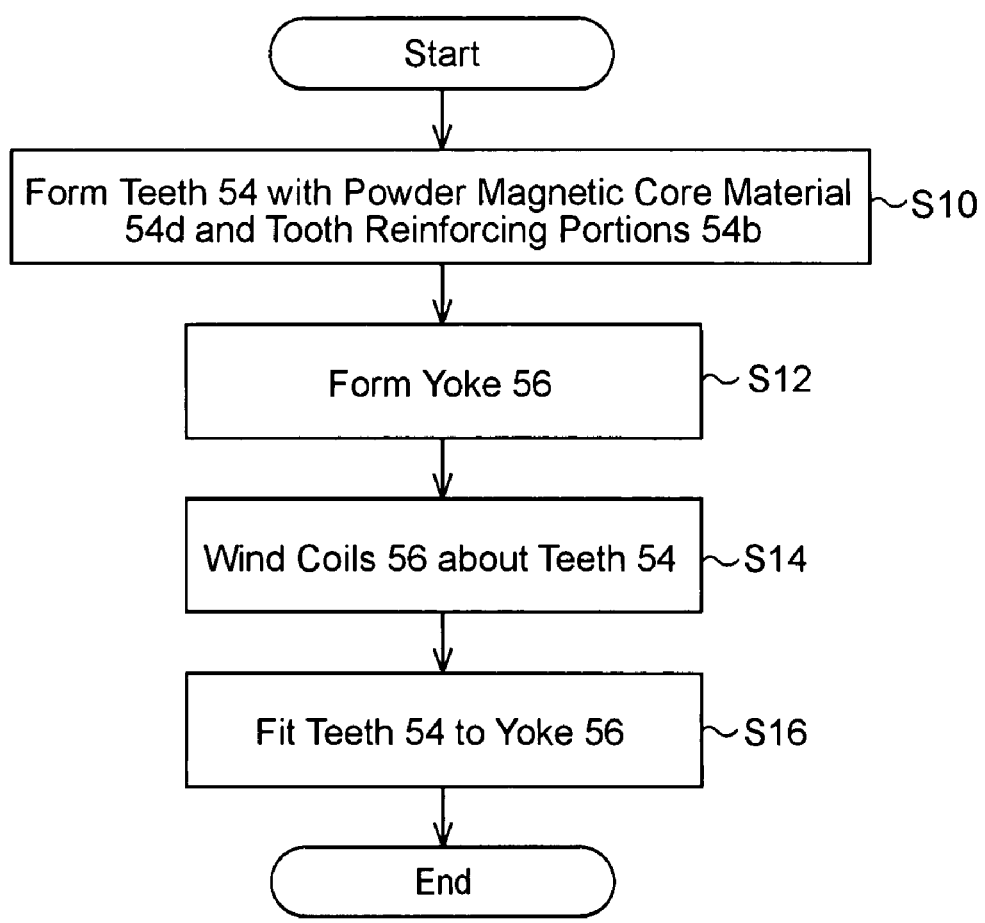
FIG. 13 is a diagram showing a manufacturing process for the stator of the electric motor shown in FIG. 4.

The process then proceeds to step 12 of FIG. 13. In step S12, the yoke 56 is formed. The description of the method for forming the yoke 56 having laminated steel plates is omitted since the method is commonly known.

Then, the process proceeds to step S14. In step S14, the coil 58 is wound about the tooth 54. In step S16, which will be discussed below, the tooth 54 is fitted to the yoke 56. Thus, the coil 58 is wound about the tooth 54 except for a part of the tooth 54 that is fitted to the yoke 56.

Then, the process proceeds to step S16. In step S16, the tooth 54, about which the coil 58 is wound, is fitted to the yoke 56. At this time, the tooth 54 is fitted to the yoke 56 such that the tooth reinforcing portion 54b contacts the wall surface of yoke 56 that defines the fitting grooves 56b.

After fitting the tooth 54 to the yoke 56, the tooth 54 may be welded to the yoke 56. For example, the surfaces of the parts at which the tooth reinforcing portion 54b contacts the steel plates forming the yoke 56 are welded.

Through the procedure from step S10 to step S16, the stator 60 having the teeth 54 formed of the powder magnetic core material 54d, the yoke 56, and the coils 58 is completed.

The order in which steps S10 to S16 are executed is not limited to the above described one. For example, the yoke 56 may be formed prior to the teeth 54. That is, step S12 may be executed prior to step S10.

Alternatively, the step for winding the coils 58 about the teeth 54 may be executed any time after the teeth 54 are formed and before the teeth 54 are fitted to the yoke 56. That is, step S14 may be executed prior to step S12.

Further, in step S10, a plurality of teeth 54 may be molded to be an integral component such that the heads of the teeth 54 are coupled to one another with coupling members made of the powder magnetic core material 54d. In this case, at the opening of the die 80, spaces between the teeth 54 are filled with the powder magnetic core material 54d, and the pressure molding is performed to form the teeth 54 shown FIG. 11. Instead of the powder magnetic core material 54d, a resin for forming coupling members 54c may be poured to the opening of the die 80 to form the teeth 54 shown in FIG. 12.

Next, the yoke 56 formed of a powder magnetic core material will be described. Components other than the yoke 56 are the same as described above. Like or the same reference numerals are given to those components that are like or the same as the corresponding components in the electric motor 50 described above, and detailed explanations are omitted.

Figure 18:
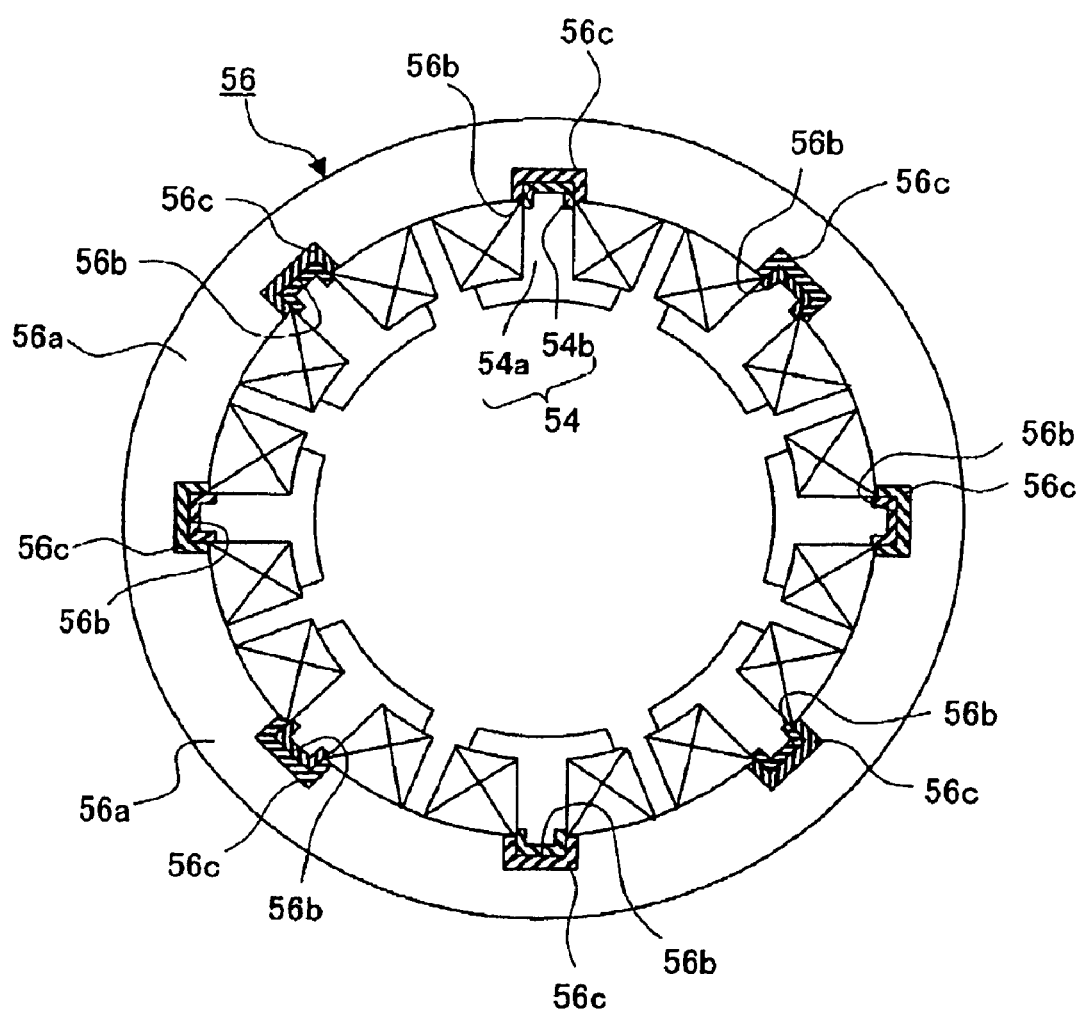
FIG. 18 is a top plan view illustrating a stator in which a tooth reinforcing portion is integrally molded with each tooth, and yoke reinforcing portions are integrally molded with a yoke.

FIG. 18 shows a top plan view of the teeth 54 and the yoke 56. The yoke 56 includes a yoke main body 56a and yoke reinforcing portions 56c. The yoke main body 56a is cylindrical, and a plurality of fitting grooves 56b are formed on the inner circumferential surface of the yoke main body 56a.

The yoke main body 56a is formed of a powder magnetic core material. The powder magnetic core material is the same as the powder magnetic core material used for forming the tooth main body 54a.

The specific resistance of the yoke main body 56a made of the powder magnetic core material is equal to or more than one hundred times that of a yoke main body made of steel. For example, the specific resistance of a yoke main body 56a made of a powder magnetic core material containing iron powder and resin is $10^{-4}$ Ωm or more. Therefore, the eddy-current loss generated in the yoke main body 56a formed of a powder magnetic core material is less than the eddy-current loss generated in the yoke main body made of steel.

The yoke reinforcing portions 56c are integrally molded with the yoke main body 56a at the wall surface defining the fitting grooves 56b. The yoke reinforcing portions 56c are made of a magnetic material having a mechanical strength higher than that of the yoke main body 56a. For example, the yoke reinforcing portions 56c are made of steel, stainless steel, soft magnetic stainless steel, or aluminum. Thus, the wall surface defining the fitting grooves 56b is reinforced by the yoke reinforcing portions 56c.

Figure 19:
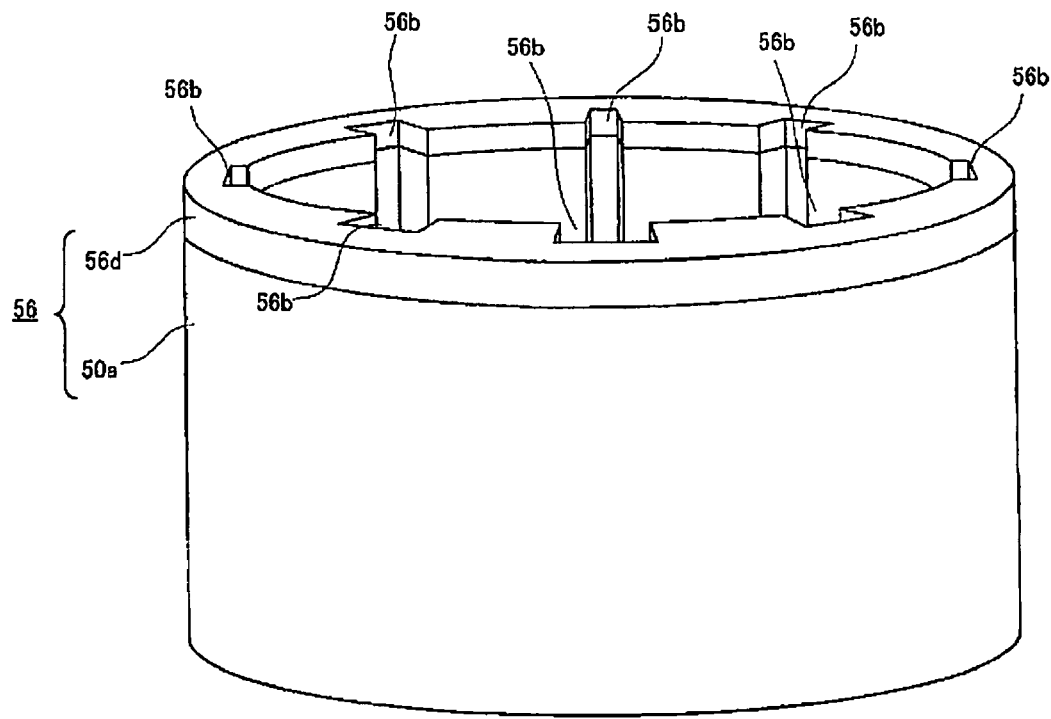
FIG. 19 is a perspective view illustrating a yoke and a yoke reinforcing layer that are integrally molded.

In the yoke 56 provided with the yoke main body 56a made of a powder magnetic core material, a yoke reinforcing layer 56d may be molded integrally with the upper surface of the yoke main body 56a so as to be coaxial with the yoke main body 56a as shown in FIG. 19. A material for forming the yoke reinforcing layer 56d is the same as the material for forming the yoke reinforcing portions 56c. The yoke reinforcing layer 56d may be formed at the lower surface of the yoke main body 56a or both of the upper and lower surfaces of the yoke main body 56a. These configurations increase the mechanical strength of the wall surface that defines the fitting grooves 56b at the openings of the yoke 56.

Figure 20:
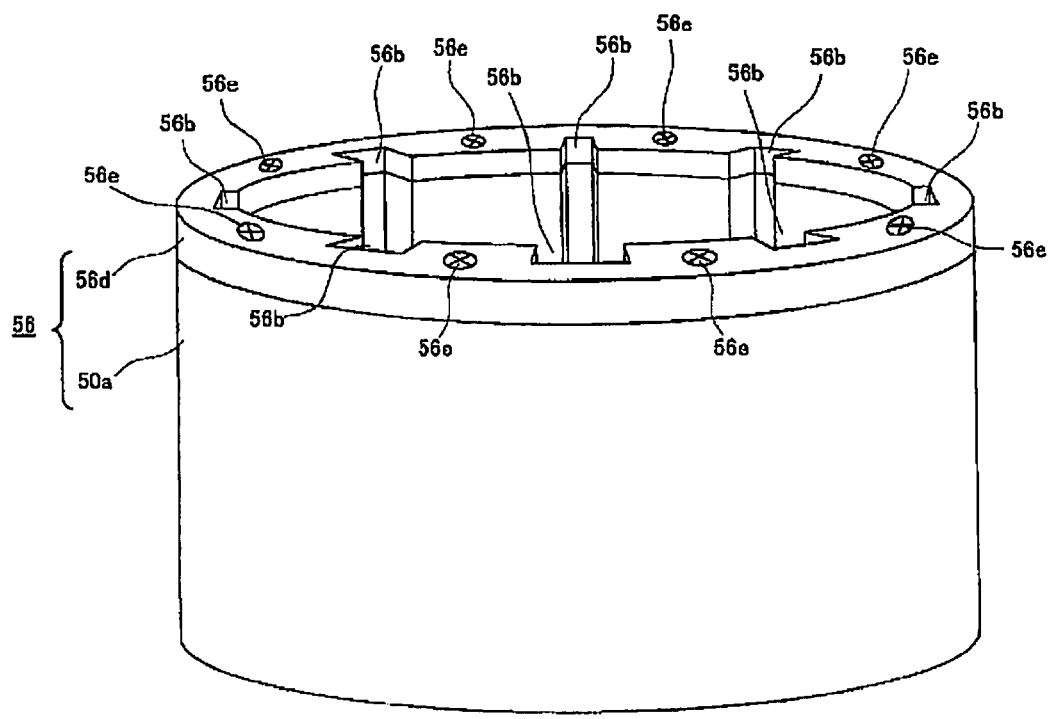
FIG. 20 is a perspective view illustrating a yoke and a yoke reinforcing layer that are separately molded.

The yoke reinforcing layer 56d may be formed separately from the yoke main body 56a, and may be attached to the upper or lower surface of the yoke main body 56a thereafter. In this case, the yoke reinforcing layer 56d may be fixed to the yoke main body 56a with screws 56e as shown in FIG. 20.

The teeth 54 are fitted to the yoke 56 such that the tooth reinforcing portions 54b contact the wall surface of yoke 56 that defines the fitting grooves 56b. The wall surface is entirely or partly protected by the yoke reinforcing portions 56c or the yoke reinforcing layer 56d. Thus, when the teeth 54 are fitted to the yoke 56, the wall surface of the fitting grooves 56b are prevented from being damaged.

After all the teeth 54 are fitted to the fitting grooves 56b, the tooth reinforcing portions 54b and the yoke reinforcing portion 56c may be welded to each other on the surface of the yoke 56. Alternatively, the tooth reinforcing portions 54b and the yoke reinforcing layer 56d are welded to each other. In this case, the teeth 54 are firmly fixed to the yoke 56.

Figure 21:
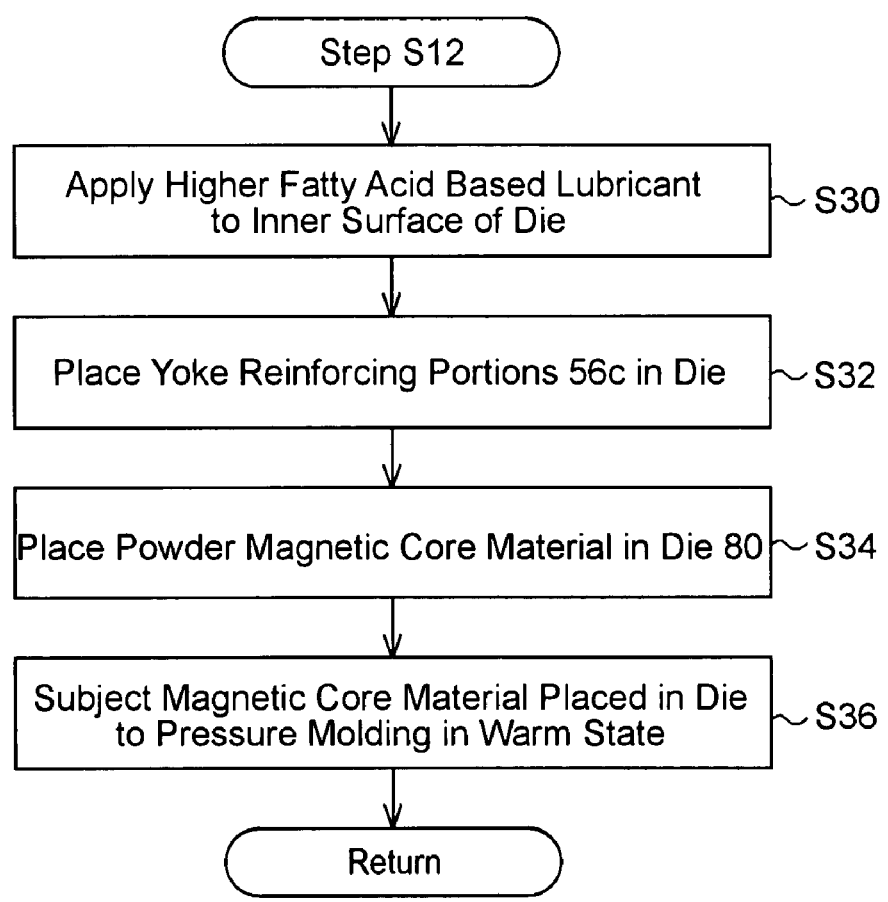
FIG. 21 is a diagram showing a manufacturing process for the yoke of FIG. 19.

Next, the procedure for manufacturing the yoke 56 having the yoke main body 56a made of a powder magnetic core material will be described with reference to FIG. 21. FIG. 21 is a detailed diagram of the manufacturing process for the yoke 56 shown in step S12 of FIG. 13. The teeth 54 are formed in accordance with step S10 of FIG. 13 and FIG. 14, which shows the details of step S10.

First, in step S30, a higher fatty acid based lubricant is applied to an inner surface of a die for molding the yoke 56.

When step S30 is completed, the process proceeds to step S32. In step S32, the yoke reinforcing portions 56c are placed in the die.

When step S32 is completed, the process proceeds to step S34. In step S34, the die, in which the yoke reinforcing portions 56c are placed, is filled with a powder magnetic core material.

When the die is filled with the powder magnetic core material, the powder magnetic core material and the die are preferably heated. For example, the powder magnetic core material and the die are heated to a temperature equal to or more than 100° C.

When step S34 is completed, the process proceeds to step S36. In step S36, the magnetic core material placed in the die is subjected to the pressure molding in a warm state. For example, the temperature of a portion in which the die contacts the magnetic core material is preferably between 100° C. and 225° C., and more preferably in a warm state between 100° C. and 180° C. Thereafter, a pressure the lower limit of which is 700 MPa is applied to the magnetic core material in the die through the opening of the die to pressure mold the yoke 56. Next, a predetermined force is applied to the die to remove the yoke 56 from the die.

When molding the yoke 56 shown in FIG. 19, the yoke reinforcing layer 56d, which has been molded in a die, may be placed in the die for molding the yoke 56, and then, the die may be filled with the powder magnetic core material. Alternatively, the yoke reinforcing layer 56d may be placed in the die for molding the yoke 56 after the die is filled with the powder magnetic core material.

When molding a yoke 56 shown in FIG. 20, the yoke main body 56a is first formed by filling the yoke molding die with a powder magnetic core material. Thereafter, the yoke reinforcing layer 56d, which has been formed separately from the yoke main body 56a, is placed on the upper surface of the yoke main body 56a. Then, the yoke reinforcing layer 56d is fixed to the yoke main body 56a with the screws 56e.

Thereafter, steps S14 to S16 in FIG. 13 are performed. As a result, the teeth 54 are fitted to the yoke 56 formed of the powder magnetic core material, so that the stator 60 is completed.

The present invention may be applied to electric motors that are different from commonly known electric motors. For example, the present invention may be applied to an axial motor 100. Like or the same reference numerals are given to those components that are like or the same as the corresponding components of the above embodiments and detailed explanations are omitted.

Figure 22:
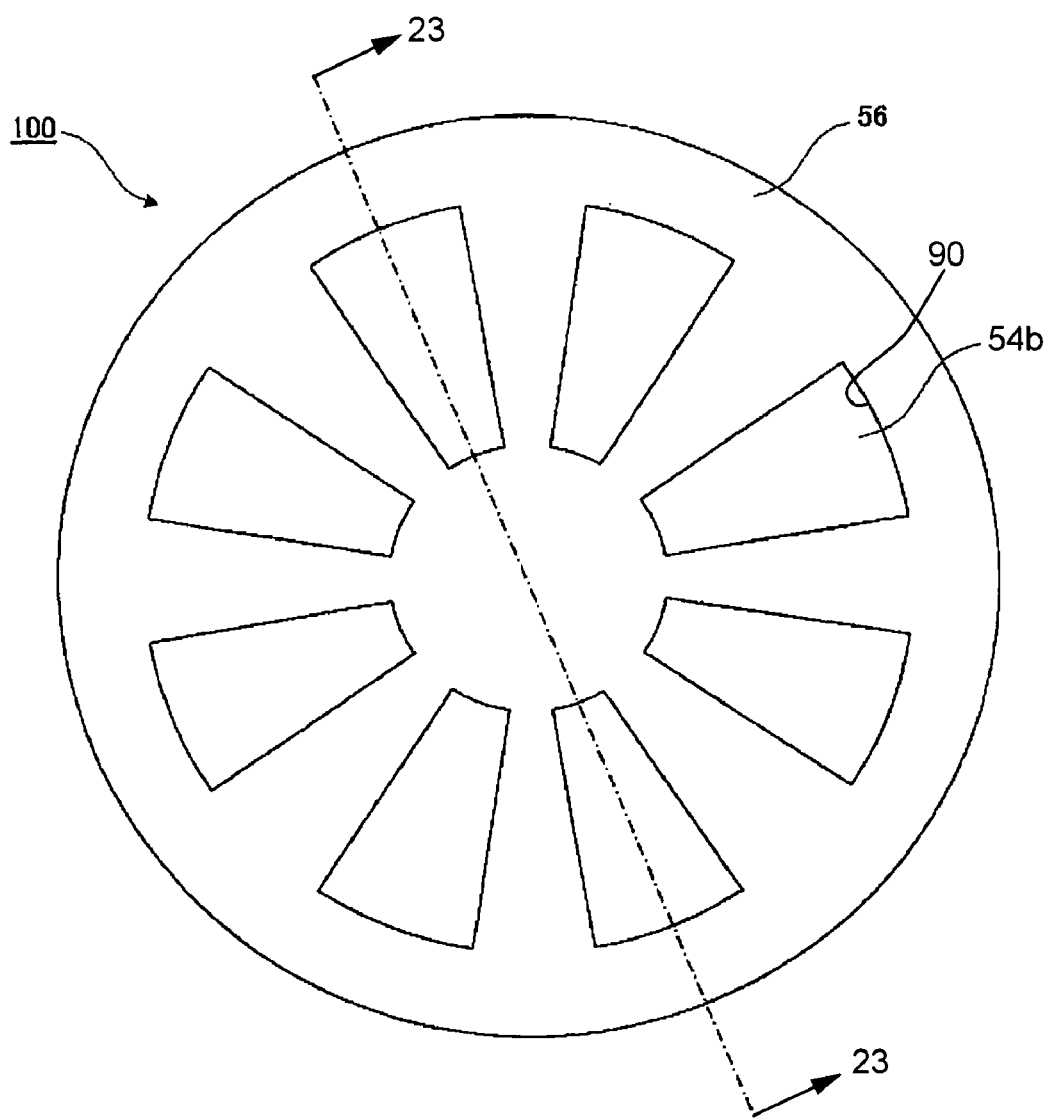
FIG. 22 is a top plan view illustrating an axial motor.
Figure 23:
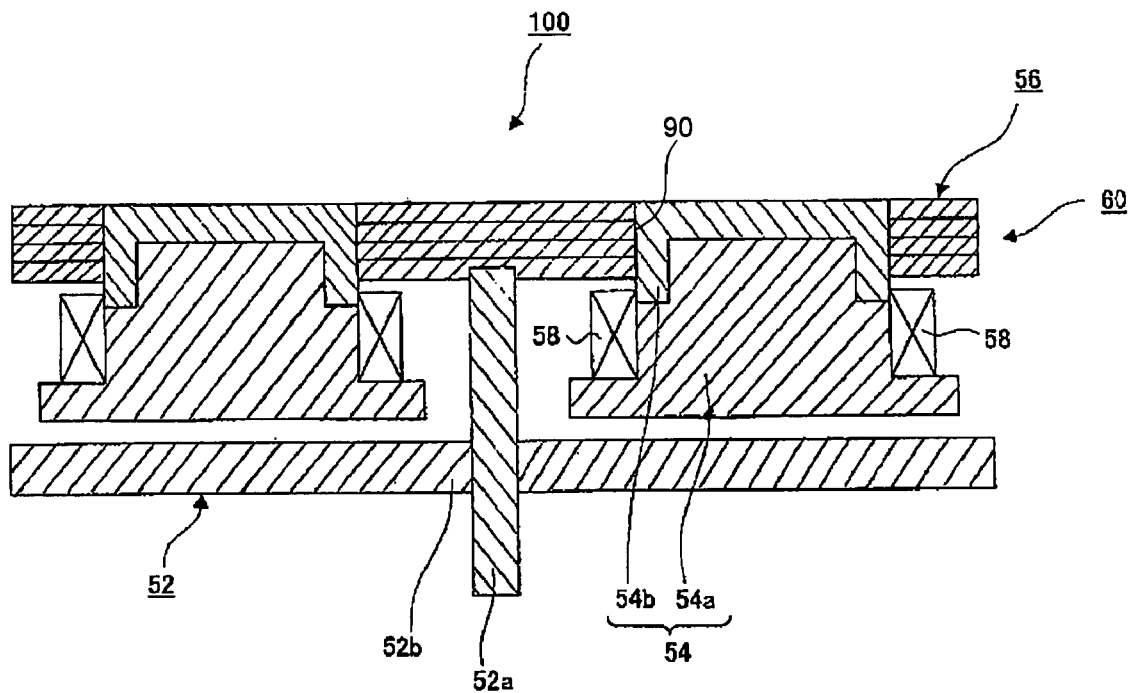
FIG. 23 is a cross-sectional view taken along line 23-23 of FIG. 22.

FIG. 22 is a top plan view of an axial motor 100. FIG. 23 is a cross-sectional view taken along line 23-23 in FIG. 22. The axial motor 100 has a rotor 52 and a stator 60. The stator 60 includes teeth 54, a yoke 56, and coils 58.

Figure 24:
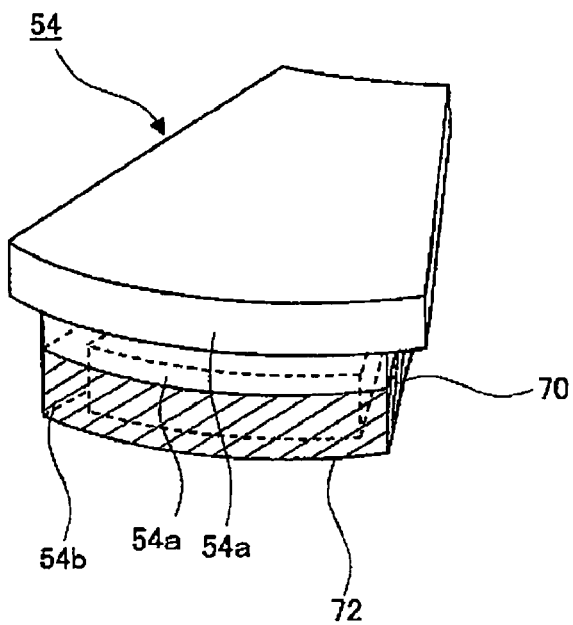
FIG. 24 is a perspective view illustrating the axial motor shown in FIG. 22.

FIG. 24 is a perspective view of the tooth 54. The tooth 54 includes a tooth main body 54a and a tooth reinforcing portion 54b.

The tooth main body 54a is formed of a powder magnetic core material. The tooth reinforcing portion 54b is made of a magnetic material having a mechanical strength higher than that of the tooth main body 54a. The powder magnetic core material forming the tooth main body 54a is the same as described above. The material forming the tooth reinforcing portion 54b is also the same as described above.

The tooth 54 has a sectoral shape when viewed from above or below, and has a substantially T-shape when viewed from the side. As shown in FIG. 23, in the tooth 54, a portion that extends toward the stator 60 is referred to as a proximal portion, and a portion that extends from one side of the proximal portion in the radial and circumferential directions of the rotor 52 is referred to as a head. The head of the tooth 54 faces the rotor 52. An end face 72 of the proximal portion of the tooth 54 has substantially the same shape and size as those of a fitting hole 90 serving as an engaging opening formed in the yoke 56.

In the tooth main body 54a, a portion that extends toward the stator 60 is referred to as a proximal portion, and a portion that extends from one side of the proximal portion in the radial and circumferential directions of the rotor 52 is referred to as a head. The tooth reinforcing portion 54b is provided at an end of the proximal portion of the tooth main body 54a. Specifically, the tooth reinforcing portion 54b has such a shape that covers the end face of the proximal portion of the tooth main body 54a and surround the four sides of the end of the proximal portion. The tooth reinforcing portion 54b is molded integrally with the tooth main body 54a. The area of the tooth 54 in which the tooth reinforcing portion 54b is formed corresponds to a portion that contacts a wall surface defining the fitting hole 90.

The coil 58 is wound about the proximal portion of the tooth 54. In the proximal portion of the tooth 54, the coil 58 is not wound about a portion in which the tooth reinforcing portion 54b is formed.

As shown in FIG. 23, the yoke 56 has a disc-shaped yoke main body 56a, which is formed by laminating disc-shaped steel plates. Each steel plate has through holes the number of which is the same as the number of the teeth 54 in the axial motor 100. The through holes are arranged along the circumference of the steel plate at equal angular intervals. The steel plates are laminated such that the through holes in each steel plate are aligned with the through holes in the adjacent steel plates. Accordingly, the fitting holes 90 are formed in the yoke main body 56a.

The tooth 54, about which the coil 58 is wound, is fitted to each fitting hole 90 formed in the yoke 56. Accordingly, the stator 60 is formed.

The rotor 52 includes a shaft 52a, and the rotor main body 52b attached to the shaft 52a. In this embodiment, the rotor main body 52b is disc-shaped. The shaft 52a of the rotor 52 is arranged to be substantially aligned with the center axis of the disc-shaped yoke 56.

Figure 25:
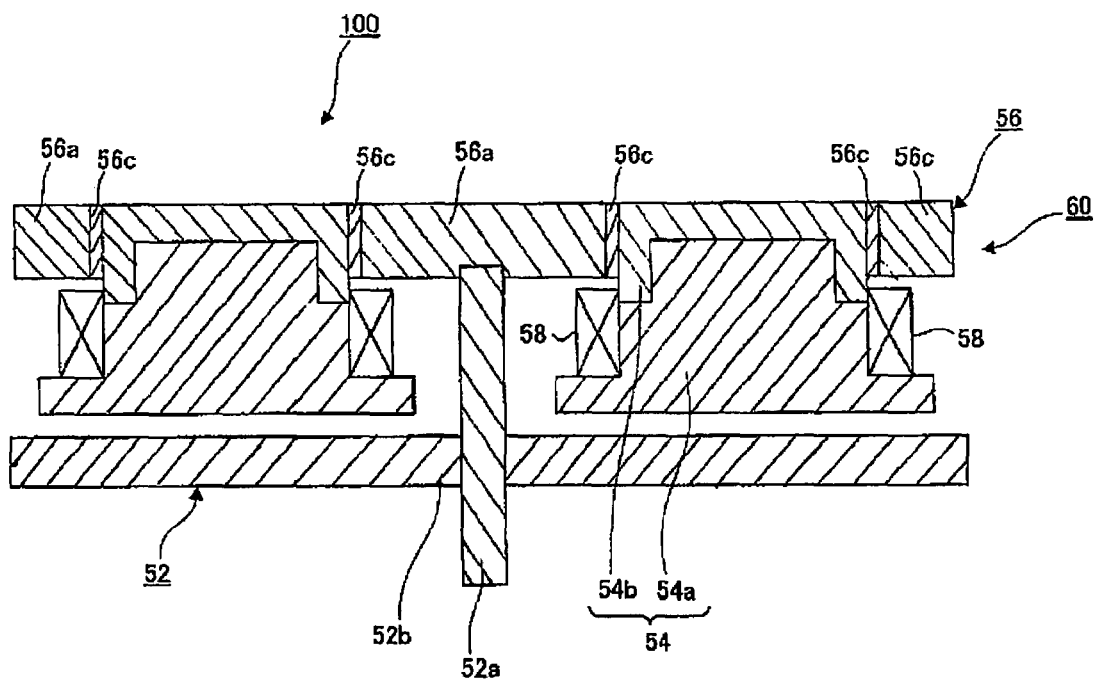
FIG. 25 is a cross-sectional view illustrating an axial motor provided with yoke reinforcing portions and a yoke main body formed of a powder magnetic core material.

As shown in FIG. 25, the yoke 56 may be formed of a yoke main body 56a, which is formed of a powder magnetic core material, and yoke reinforcing portions 56c. The yoke reinforcing portions 56c are integrally molded with the yoke main body 56a such that the yoke reinforcing portions 56c cover at least part of the wall surface defining the fitting holes 90. Alternatively, a disc-shaped yoke reinforcing layer 56d may be integrally molded with an upper surface or a lower surface of the yoke main body 56a.

Figure 26:
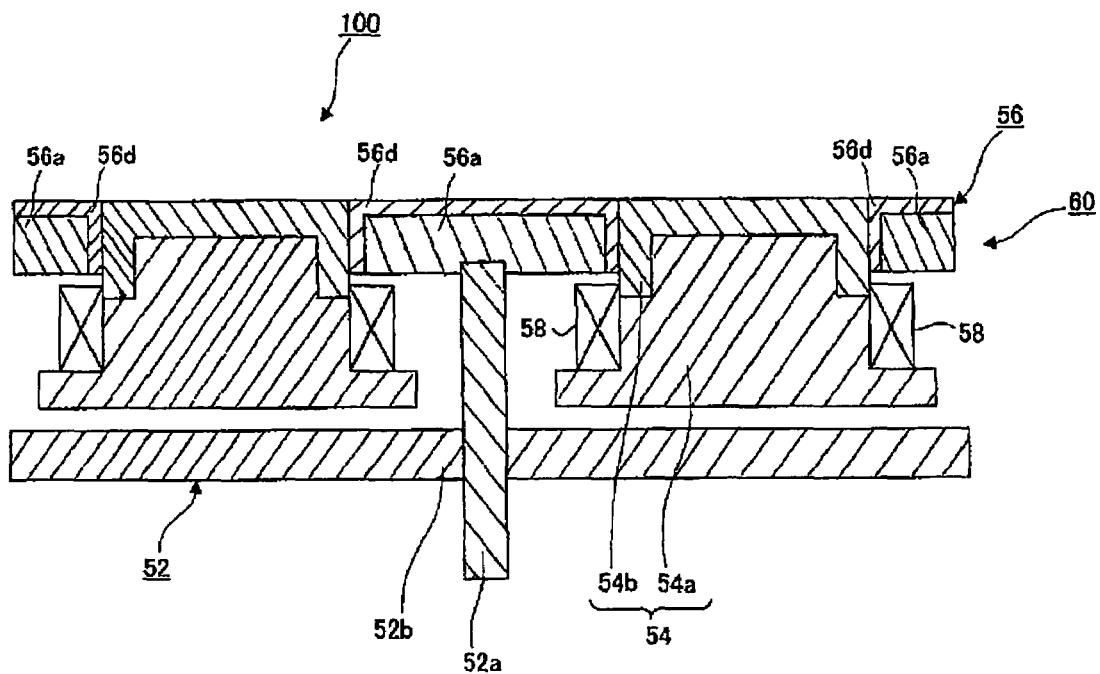
FIG. 26 is a cross-sectional view illustrating another axial motor having a yoke reinforcing layer and a yoke main body formed of a powder magnetic core material.

As shown in FIG. 26, the yoke reinforcing layer 56d may be molded to cover the upper or lower surface of the yoke main body 56a, and the wall surface defining the fitting holes 90. Particularly, the shape of the yoke reinforcing layer 56d is preferably determined in such manner as to protect corners of the yoke main body 56a when the tooth 54 is inserted into each fitting hole 90.

Alternatively, the disc-shaped yoke main body 56a and the disc-shaped yoke reinforcing layer 56d may be formed separately from each other, and the yoke reinforcing layer 56d may be attached to the upper or lower surface of the yoke main body 56a to form the yoke 56. In this case, the yoke reinforcing layer 56d may be fixed to the yoke main body 56a with the screws 56e. Alternatively, the yoke reinforcing layer 56d may be fixed to the yoke main body 56a through shrink fitting. In this case, the yoke reinforcing layer 56d is heated to be thermally expanded. Then the yoke reinforcing layer 56d is fixed to the yoke main body 56a. Subsequently, the yoke main body 56a is cooled.

The heads of the teeth 54 provided in the stator 60 of the axial motor 100 may be coupled to each other by means of coupling members made of a powder magnetic core material or a resin. That is, a number of teeth may be molded to be an integral component.

The stator 60 in the axial motor 100 is manufactured through the same method and the same steps as described above.

The invention claimed is:

1. A stator of an electric motor, comprising:
   a plurality of teeth each having a tooth main body and a tooth reinforcing portion, the tooth main body being formed of a powder magnetic core material, and the tooth reinforcing portion being integrally molded with at least a part of a surface of the tooth main body and being formed of metal having a higher mechanical strength than that of the tooth main body, and surrounding a proximal portion in rectangular shape;
   coils each being wound about one of the teeth; and
   a yoke having fitting openings each receiving one of the teeth, wherein the yoke includes a yoke main body made of a powder magnetic core material and yoke reinforcing portions each provided on at least a part of a wall surface defining one of the fitting openings, the yoke reinforcing portion being molded integrally with the yoke main body and being formed of metal having a higher mechanical strength than that of the yoke main body, and wherein each tooth is fitted to the corresponding fitting opening in such a manner that the tooth reinforcing portion contacts the corresponding yoke reinforcing portion.

2. The stator according to claim 1, wherein the yoke reinforcing portions are mechanically fixed to the yoke main body.

3. The stator according to claim 1, wherein each tooth reinforcing portion is welded to the corresponding yoke reinforcing portion.

4. An electric motor comprising: a stator, wherein the stator includes:
- a plurality of teeth each having a tooth main body and a tooth reinforcing portion, the tooth main body being formed of a powder magnetic core material, and the tooth reinforcing portion being integrally molded with at least a part of a surface of the tooth main body and being formed of metal having a higher mechanical strength than that of the tooth main body;
- coils each being wound about one of the teeth; and
- a disc-shaped yoke having fitting holes each receiving one of the teeth, each fitting hole extending through the yoke from a front surface to a back surface, wherein the yoke includes a yoke main body made of a powder magnetic core material and yoke reinforcing layer each provided on at least a part of a wall surface defining one of the fitting holes and provided on the front surface or the back surface of the yoke, the yoke reinforcing layer being molded integrally with the yoke main body and being formed of metal having a higher mechanical strength than that of the yoke main body, and wherein each tooth is fitted to the corresponding fitting hole in such a manner that the tooth reinforcing portion contacts the corresponding yoke reinforcing layer; and
- a rotor having a disc-shaped rotor main body and a shaft, the rotor main body being coaxially arranged with the yoke, and the shaft being coaxially arranged with the rotor main body, wherein the rotor main body is displaced in an axial direction from the teeth.

* * * * *